United States Patent [19]

Fullerton

[11] Patent Number: 4,979,186
[45] Date of Patent: * Dec. 18, 1990

[54] TIME DOMAIN RADIO TRANSMISSION SYSTEM

[75] Inventor: Larry W. Fullerton, Huntsville, Ala.

[73] Assignee: Charles A. Phillips, Ardmore, Tenn.; a part interest

[ * ] Notice: The portion of the term of this patent subsequent to Mar. 14, 2006 has been disclaimed.

[21] Appl. No.: 322,538

[22] Filed: Mar. 13, 1989

Related U.S. Application Data

[63] Continuation-in-part of Ser. No. 10,440, Feb. 3, 1987, Pat. No. 4,813,057, which is a continuation-in-part of Ser. No. 677,597, Dec. 3, 1984, Pat. No. 4,641,317.

[51] Int. Cl.$^5$ ................ H04B 15/00; H04K 1/00
[52] U.S. Cl. ................................. 375/23; 375/37
[58] Field of Search ............ 375/1, 23, 37, 96, 115; 370/10, 107; 329/313; 332/106; 307/265, 271; 380/35

[56] References Cited

U.S. PATENT DOCUMENTS

| | | | |
|---|---|---|---|
| 3,728,632 | 4/1973 | Ross | 328/59 |
| 3,806,795 | 4/1974 | Morey | 375/23 |
| 4,070,550 | 1/1978 | Miller, Jr. et al. | 375/23 |
| 4,324,002 | 4/1982 | Spilker, Jr. | 375/23 |
| 4,380,746 | 4/1983 | Sun et al. | 375/23 |
| 4,641,317 | 2/1987 | Fullerton | 375/23 |
| 4,813,057 | 3/1989 | Fullerton | 375/37 |

OTHER PUBLICATIONS

Bennett et al, "Time—Domain Electromagnetic and its Applications", Proceedings of the IEEE, vol. 66, No. 3, Mar. 1978.

Cook, J. C., "Monocycle Radar Pulse as Environmental Probes", Institute and Technology, The University of Michigan.

*Primary Examiner*—Douglas W. Olms
*Assistant Examiner*—Stephen Chin
*Attorney, Agent, or Firm*—Phillips & Beumer

[57] ABSTRACT

A time domain communications system wherein time modulated, impulse derived signals are multiplied by a template signal, integrated, and then demodulated. By this process, usable signals are obtained which would be otherwise obscured by noise.

23 Claims, 5 Drawing Sheets

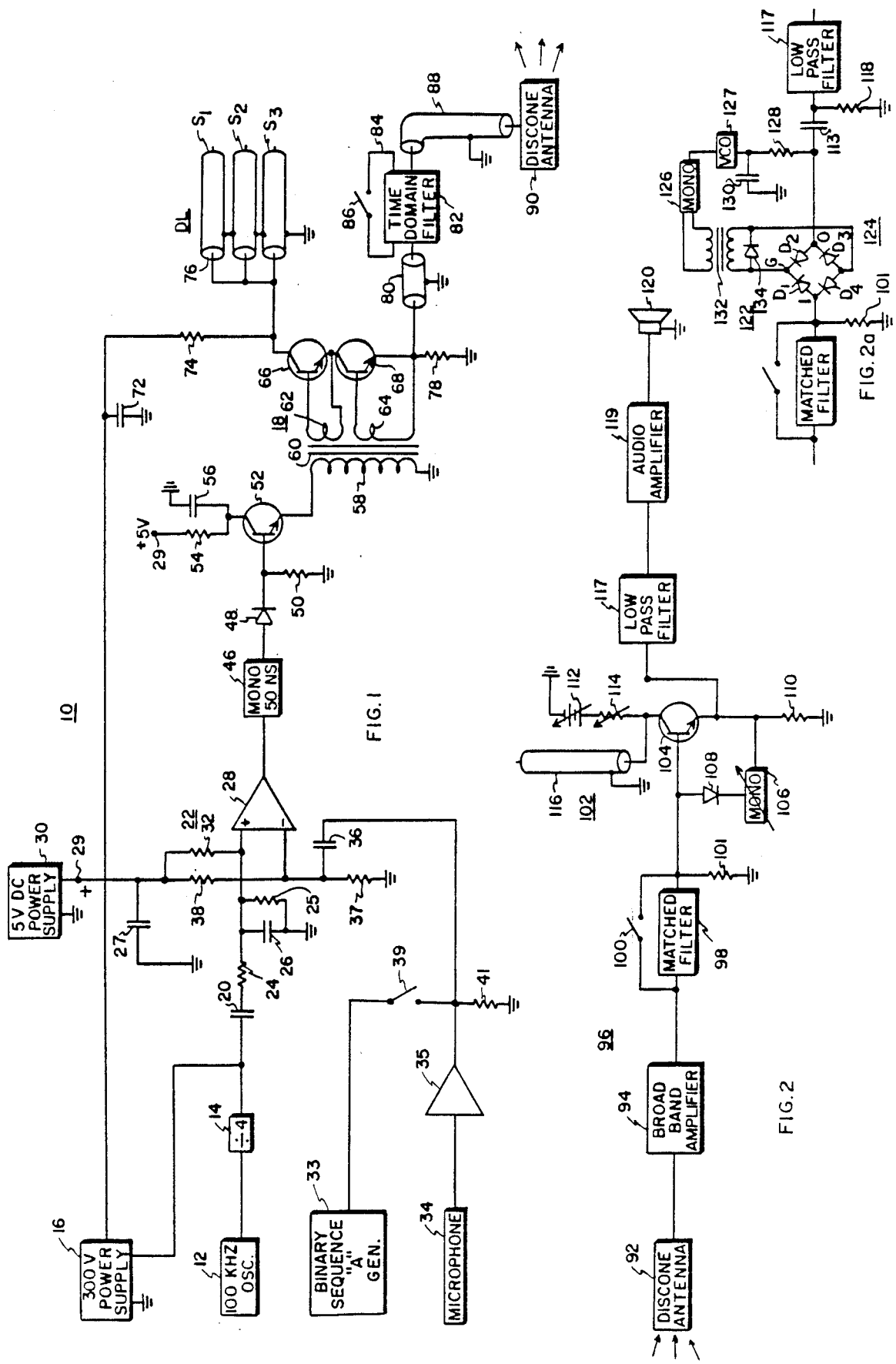

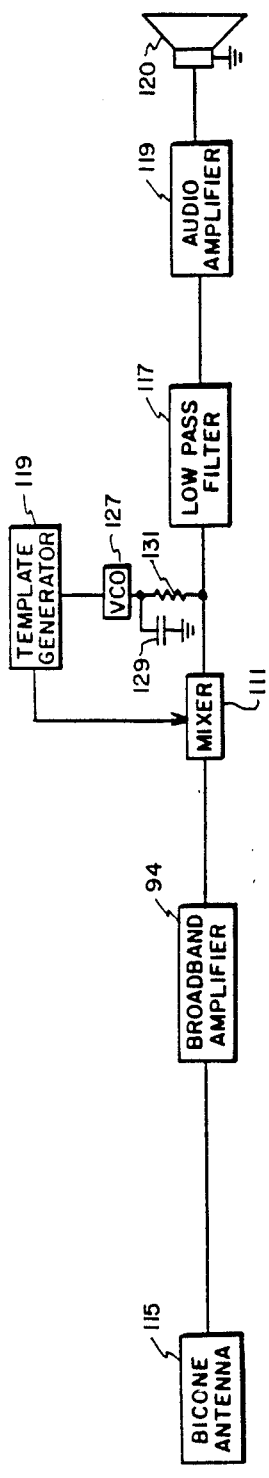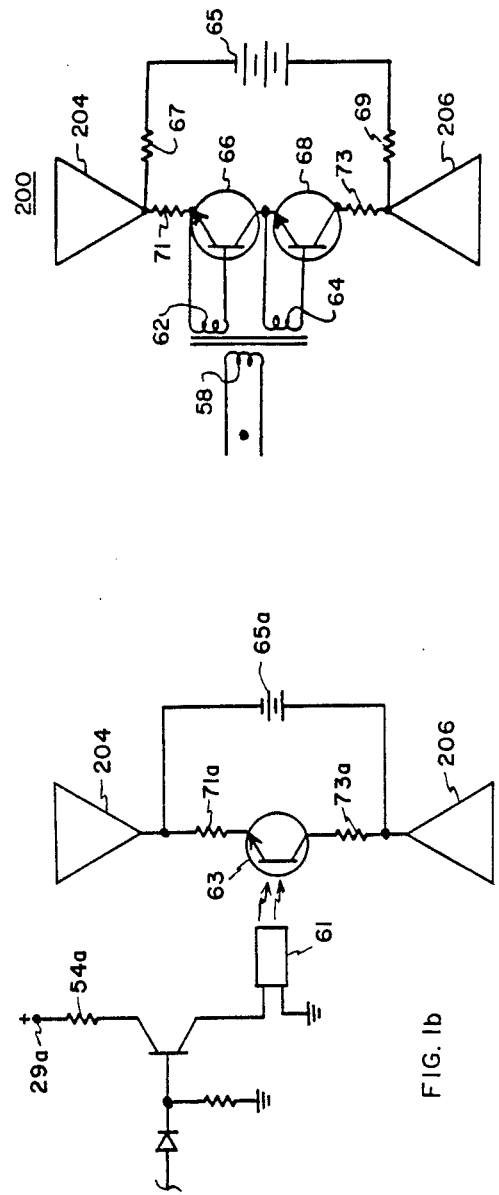
FIG. 3
FIG. 1a
FIG. 1b

TIME DOMAIN RADIO TRANSMISSION SYSTEM

CROSS-REFERENCE OF RELATED APPLICATION

This application is a continuation-in-part of application Ser. No. 07/010,440, filed Feb. 3, 1987, U.S. Pat. No. 4,813,057 entitled "Time Domain Radio Transmission System," which is a continuation-in-part of application Ser. No. 06/677,597, filed Dec. 3, 1984, U.S. Pat. No. 4,641,317 entitled "Spread Spectrum Radio Transmission System."

FIELD OF THE INVENTION

This invention relates generally to radio transmission systems and particularly to a time domain system wherein spaced, pulse generated units of wide frequency band electromagnetic energy are transmitted via a broadband antenna.

BACKGROUND OF THE INVENTION

The radio transmission of both analog and digital communications intelligence is normally effected by one of two methods. In one, referred to as an amplitude modulation system, a sinusoidal radio frequency carrier is modulated in amplitude in terms of the intelligence or communications signal, and when the signal is received at a receiving location, the reverse process, that is, demodulation of the carrier, is effected to recover the communications signal. The other system employs what is termed frequency modulation, and instead of amplitude modulation of the carrier signal, it is frequency modulated. When a frequency modulated signal is received, circuitry is employed which performs what is termed discrimination wherein changes in frequency are changed to changes in amplitude in accordance with the original modulation, and thereby a communications signal is recovered. In both systems, there is as a basis a sinusoidal carrier which is assigned and occupies a distinctive frequency band width, or channel, and this channel occupies spectrum space which, if interference is to be avoided, cannot be utilized by other transmissions.

At this time, almost every nook and cranny of spectrum space is being utilized, and there is a tremendous need for some method of expanding the availability of medium for communications. In consideration of this, it has been suggested that instead of the use of discrete frequency channels for radio communications links, which is the conventional approach, a radio transmission link employing a wider frequency spectrum could be divided which may extend over a range of 10 to 100 times the intelligence band width being transmitted, but wherein the energy of any single frequency making up that spectrum be very low, typically below normal noise levels. While it is obvious that this type of transmission would be essentially non-interfering with other services, the applicant is unaware of any available system for practicing this.

SUMMARY OF THE INVENTION

In accordance with this invention, repetitive signals having a fast changing edge of a fixed or programmed rate is generated, and a distance portion of a signal having an abrupt signal edge is varied or modulated as to its time of occurrence and supplied to an antenna. Reception is effected by a radio receiver which synchronously detects the transmitted intelligence via a template signal including a like polarity pattern to that of the transmitted signal, preferably also having a like amplitude pattern is employed. It is to be noted that the term "pulse" as used herein refers to signals of the category derived as described in the preceding sentence.

It is significant that the applicant has recognized and has accomplished demodulation of impulse signals having rise times on the order of a nanosecond and wherein modulation and demodulation involves shifts in the position of such transitions on the order of ±200 picoseconds. In one mode, multiplication of the template and received signal is effected to enhance detection by increasing the selectivity of the receiver.

BRIEF DESCRIPTION OF THE DRAWINGS

FIG. 1 is a combination block-schematic diagram of a time domain transmitter.

FIGS. 1a–1c are schematic diagrams of alternate forms of the output stage for the transmitter shown in FIG. 1.

FIG. 2 is a combination block-schematic diagram of a time domain receiver as contemplated by this invention.

FIG. 2a is a combined block-schematic electrical diagram of an alternate form of synchronous detector to the one shown in FIG. 2.

FIG. 3 is an electrical block diagram of an alternate embodiment of a time domain receiver.

DETAILED DESCRIPTION OF THE DRAWINGS

Figure 1C:
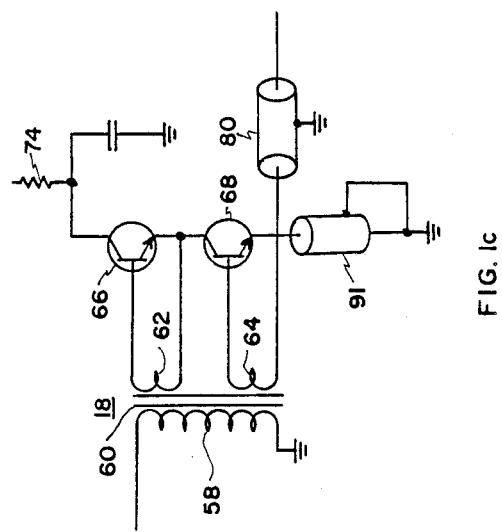

Referring to FIG. 1, and initially to transmitter 10, a base frequency of 100 KHz is generated by oscillator 12, typically being a crystal controlled oscillator. Its output, a pulse signal, is applied to divide-by-4 divider 14 to provide at its output a 25 KHz, a 0–5 volt, pulse signal shown in waveform A of FIG. 4. Further alphabetic references to waveforms will simply identify them by their letter identity and will not further refer to the figure, which will be FIG. 4. The 25 KHZ output is employed as a general transmission signal and as an input to power supply 16. The latter is regulated, one which supplies a 300-volt D.C. bias on a non-interfering basis for the output stage 18 of transmitter 10, which is also keyed at the 25 KHz rate.

The output of divide-by-four divider 14 is employed as a signal base and as such is supplied through capacitor 20 to pulse position modulator 22. Pulse position modulator 22 includes in its input an RC circuit consisting of resistor 24 and capacitor 26 which convert the square wave input to an approximately triangular wave as shown in waveform B, it being applied across resistor 25 to the non-inverting input of comparator 28. A selected or reference positive voltage, filtered by capacitor 27, is also applied to the non-inverting input of comparator 28, it being supplied from +5 volt terminal 29 of D.C. bias supply 30 through resistor 32. Accordingly, for example, there would actually appear at the non-inverting input a triangular wave biased upward positively as illustrated by waveform C.

The actual conduction level of comparator 28 is determined by an input signal supplied through capacitor 36, across resistor 37, to the inverting input of comparator 28, as biased from supply 30 through resistor 38 and across resistor 32. The combined signal input bias is illustrated in waveform D. Signal input may be simply the audio output of microphone 34, amplified, if needed, by amplifier 35. Alternately, with switch 39 closed, it may be the sum of the audio output and a signal offset or dither voltage, for example, provided by the output of signal generator 33, signals being summed across resistor 41. Signal generator 33 may, for example, provide a sine, binary, or other signal, and as illustrated, it is labeled as providing a "binary signal A." Thus, generator 33 would provide a binary signal voltage as a sequence of discrete voltage pulses varying between zero voltage and some discrete voltage, which may be representative of letters or numerical values or simply a random one. By virtue of the thus described input combination, the output of comparator 28 would rise to a positive saturation level when triangular wave signal 40 (waveform E) is of a higher value than the effective modulation signal 42 and drop to a negative saturation level when modulation signal 42 is of a greater value than the triangular wave signal 40. The output signal of comparator 28 is shown in waveform F, and the effect is to vary the turn-on and turn-off of the pulses shown in this waveform as a function of the combination of the intelligence and dither signal where one is employed. Thus, there is effected a pulse position modulation from an amplitude signal. The dither signal enables an added discrete pattern of time positions to be included to a transmitted signal, thus requiring that to receive and demodulate it, the dither signal be accurately reproduced. With respect to the output signal of comparator 28, we are interested in employing a negative going or trailing edge 44 of it, and it is to be noted that this trailing edge will vary in its time position as a function of the signal modulation. This trailing edge of the waveform, in waveform F, triggers "on" mono, or monostable multivibrator, 46 having an "on" time of approximately 50 nanoseconds, and its output is shown in waveform G. For purposes of illustration, while the pertinent leading or trailing edges of related waveforms are properly aligned, pulse widths and spacings (as indicated by break lines, spacings are 40 microseconds) are not related in scale. Thus, the leading edge of pulse waveform G corresponds in time to the trailing edge 44 (waveform F) and its time position within an average time between pulses of waveform G is varied as a function of the input modulation signal to comparator 28.

The output of mono 46 is applied through diode 48 across resistor 50 to the base input of NPN transistor 52 operated as a triggering amplifier. It is conventionally biased through resistor 54, e.g., 1.5K ohms, from +5 volt terminal 29 of 5 volt power supply 30 to its collector. Capacitor 56 having an approximate capacitance of 0.1 mf is connected between the collector and ground of transistor 52 is enable full bias potential to appear across the transistor for its brief turn-on interval, 50 nanoseconds. The output of transistor 52 is coupled between its emitter and ground to the primary 58 of trigger transformer 60. Additionally, transistor 52 may drive transformer 60 via an avalanche transistor connected in a common emitter configuration via a collector load resistor. In order to drive transformer 60 with a steep wave front, an avalanche mode operated transistor is ideal. Identical secondary windings 62 and 64 of trigger transformer 60 separately supply base-emitter inputs to NPN avalanche, or avalanche mode operated, transistors 66 and 68 of power output stage 18. Although two are shown, one or more than two may be employed when appropriately coupled.

With avalanche mode operated transistors 66 and 68, it has been found that such mode is possible from a number of types of transistors not otherwise labeled as providing it, such as a 2N2222, particularly those with a metal can. The avalanche mode referred to is sometimes referred to as a second breakdown mode, and when transistors are operated in this mode and are triggered "on," their resistance rapidly goes quite low (internally at near the speed of light), and they will stay at this state until collector current drops sufficiently to cut off conduction (at a few microamperes). Certain other transistors, such as a type 2N4401, also display reliable avalanche characteristics. As shown, collector-emitter circuits of two transistors are connected in series, and collector bias of +300 volts is applied to them from power supply 16, across filter capacitor 72, and through resistor 74 to one end 76 of parallel connected delay lines DL. While three sections S1-S3 are shown, typically five to ten would be employed as necessary to produce the desired waveform. They may be constructed of type RG58 coaxial cable, and each being approximately three inches in length as required to totally effect an approximately 1 nanosecond pulse. As shown, the positive input potential from resistor 74 is connected to the center conductor of each of the delay lines, and the other conductors are connected to ground. Resistor 74 is on the order of 50K ohms and is adjusted to allow a current flow through transistors 66 and 68 of about 0.2 MA which is a zener current which places both transistors in a near self-triggering state. It has been found that under this condition, the transistors will self-adjust to an avalanche voltage which may be different for the two. Normally, resistor 74 will still be of value which will enable charging of the delay lines DL between pulses. Delay lines DL are charged to 300 volts bias during the period when transistors 66 and 68 are turned off, between input pulses. When the inputs to transistors 66 and 68 are triggered "on" by a triggering pulse they begin to conduct within 0.5 nanoseconds or less, and by virtue of the low voltage drop across them (when operated in an avalanche mode as they are), about 120 volts appears as a pulse across output resistor 78, e.g., 50 ohms.

Significantly, the turn-on or leading edge of this pulse is effected by the trigger pulse applied to the inputs of transistors 66 and 68, and the trailing edge of this output pulse is determined mostly by the discharge time of delay lines DL. By this technique, and by choice of length and characteristic impedance of the delay lines, a well-shaped, very short pulse, on the order of 1 nanosecond and with a peak power of approximately 300 watts, is generated. Following turn-off, delay lines DL are recharged through resistor 74 before the arrival of the next triggering pulse. As will be apparent, power stage 18 is extremely simple and is constructed of quite inexpensive circuit elements. For example, transistors 66 and 68 (if 2N2222 are used) are available at a cost of approximately $0.12.

The output of power output stage 18 appears across resistor 78 and is supplied through coaxial cable 80 to a time domain shaping filter 82 which would be employed to affix a selected signature to the output as a form of encoding or recognition signal. Alternately, filter 82 may be omitted where such security measures are not deemed necessary; and, as indicative of this, a bypass line 84 including a switch 86 diagrammatically illustrates such omission. The signal output of filter 82, or directly the output of power stage 18, is supplied through coaxial cable 88 to discone antenna 90, which is an aresonant or other broadband antenna. This type of antenna relatively uniformly radiates all signals of a frequency above its cut-off frequency, which is a function of size, for example, signals above approximately 50 MHz for a relatively small unit. In any event, antenna 90 radiates a wide spectrum signal, an example being shown in the time domain in waveform H of FIG. 4, this waveform being the composite of the shaping effects of filter 82, if used, and, to an extent, of the response of discone antenna 90.

FIG. 1a illustrates an alternate and simplified output stage. As illustrated, biconical antenna 200, as a broadband antenna, is charged by a D.C. source 65 through resistors 67 and 69 to an overall voltage which is the sum of the avalanche voltage of transistors 66 and 68 as discussed above. Resistors 67 and 69 together have a resistance value which will enable transistors 66 and 68 to be biased as described above. Resistors 71 and 73 are of relatively low value and are adjusted to receive energy below the frequency of cut-off of the antenna and also to prevent ringing. In operation, when a pulse is applied to the primary 58 of pulse transformer 60, transistors 66 and 68 are turned on, effectively shorting, through resistors 71 and 73, biconical antenna elements 204 and 206 (FIG. 1a). This action occurs extremely fast, with the result that a signal is generated generally as shown in waveform H. It is transmitted as described above for the transmitter output system shown in FIG. 1.

FIG. 1b illustrates an alternate embodiment of a transmitter output stage. It varies significantly from the one shown in FIG. 1a in that it employs a light responsive avalanche transistor 63, e.g., a 2N3033. Similar components are designated with like numerical designations to that shown in FIG. 1a but with the suffix "a" added. Transistor 63 is triggered by laser diode or fast turn-on LED (light emitting diode) 61, in turn driven by avalanche transistor 52 generally operated as shown in FIG. 1. By employment of a light activated avalanche or other avalanche mode operated semiconductor switches (now existing or soon appearing), or a series of them connected in series, it appears that the voltage for power source 65 may be elevated into the multikilovolt range, thus enabling a power output essentially as high as desired. In this respect, and as a particular feature of this invention, a light triggered, gallium arsenide, avalanche mode operated switch would be employed.

FIG. 1c illustrates two alternate features with respect to the output stage shown in FIG. 1. Thus, instead of delay line DL, there is substituted a small capacitor 89, e.g., 30–100 picofarad, which would initially provide a stored collector power bias input to transistors 66 and 68 and would discharge through them. Its use enables an extremely short rise time from this stage.

Additionally, a delay line 91 is employed in place of emitter-resistor 78. Its role is to pull down to zero the transmitter output sharply following the turn-on of the transistors. During turn-on, it presents the normal characteristic impedance of the delay line. Typically, it would be chosen to have the same characteristic impedance as transmission line 80. Thus, it would be matched to it and would be a smooth transmission of power. However, at the end of the rise time of the signal, delay line 91 would present essentially a zero impedance, or short, to the output and thus abruptly bringing to zero the output following the rise of the transmitter stage.

Referring back to FIG. 1, the output of discone antenna 90, or bicone antennas 204 and 206 (FIg. 1a), is typically transmitted over a discrete space and would typically be received by a like broadband antenna, e.g., discone antenna 92 of receiver 96 at a second location (FIG. 2). Although transmission effects may distort the waveform some, for purposes of illustration, it will be assumed that the waveform received will be a replica of waveform H. The received signal is amplified by broadband amplifier 94, having a broadband frequency response over the range of the transmitted signal. In instances where a filter 82 is employed in transmitter 10, a reciprocally configured filter 98 would be employed. Filter 98 may also be constructed so as to remove distortions which may occur during transmission. As illustrative of instances where no matched filter would be employed, there is diagrammatically illustrated a switch 100 connecting the input and output of filter 98, denoting that by closing it, filter 98 would be bypassed. Assuming that no matched filter is employed, the output of broadband amplifier, as an amplified replica of waveform H, is illustrated in waveform I. In either case, it appears across resistor 101.

Signal waveform I is applied to synchronous detector 102. Basically, it has two functional units, avalanche transistor 104 and adjustable mono 106. Mono 106 is driven from an input across emitter-resistor 110, connected between the emitter of avalanche transistor 104 and ground. Avalanche transistor 104 is biased from variable voltage D.C. Source 112, e.g., 100 to 130 volts, through variable resistor 114, e.g., 100K to 1M ohms. A delay line 116 is connected between the collector and ground of transistor 104 and provides the effective operating bias for transistor 104, it being charged between conduction periods as will be described.

Assuming now that a charging interval has occurred, avalanche transistor 104 will be turned on, or triggered, by a signal applied to its base from across resistor 101. It will be further assumed that this triggering is enabled by the Q output, waveform J, of mono 106 being high. Upon being triggered, the conduction of avalanche transistor 104 will produce a rising voltage across emitter resistor 110, waveform K, and this voltage will in turn trigger mono 106 to cause its Q output to go low. This in turn causes diode 108 to conduct and thus effectively shorting out the input to avalanche transistor 104, this occurring within 2 to 20 nanoseconds from the positive leading edge of the input signal, waveform I. The conduction period of transistor 104 is precisely set by the capacity and electrical length of delay line 116. With a delay line formed of 12" of unterminated RG58 coaxial cable, and with a charging voltage of approximately 110 volts, this period is set, for example, at approximately 2 nanoseconds. One or more parallel sections of coaxial cable having lengths ranging from 0.25" to 30" may be employed, with appropriate variation in ontime.

Mono 106 is adjustable to set a switching time for its Q output to return high at a selected time, following it being a triggered as described. When it does, diode 108 would again be blocked and thus the shorted condition on the base input of avalanche transistor 104 removed, enabling it to be sensitive to an incoming signal. For example, this would occur at time T1 of waveform J. The period of delay before switching by mono 106 is set such that renewed sensitivity for avalanche amplifier 104 occurs at time point T1, just before it is anticipated that a signal of interest will occur. As will be noted, this will be just before the anticipated occurrence of a signal pulse of waveform I. Thus, with a repetition rate of 25 KHz for the signal of interest, as described, mono 106 would be set to switch the Q output from low to high just under a 40 microsecond, or 40,000 nanosecond, period. Considering that the width of the positive portion of the input pulse is only about 20 nanoseconds, thus, during most of the time, synchronous detector 102 is insensitive. The window of sensitivity is illustrated as existing from time T1 to T2 and is tunable in duration by conventional timing adjustment of mono 106. Typically, it would be first tuned fairly wide to provide a sufficient window for rapid locking onto a signal and then be tuned to provide a narrower window for a maximum compression ratio.

The output signal of avalanche transistor 104, waveform K, is a train of constant width pulses having a leading edge timing varying as a function of modulation. Thus, we have a form of pulse position modulation present. It appears across emitterresistor 110, and it is fed from the emitter of transistor 104 to an active type low pas filter 117. Low pass filter 117 translates, demodulates, this thus varying pulse signal to a base band intelligence signal, and this is fed to, and amplified by, audio amplifier 119. Then, assuming a voice transmission as illustrated here, the output of audio amplifier 119 is fed to and reproduced by loud speaker 120. If the intelligence signal were otherwise, appropriate demodulation would be employed to detect the modulation present.

It is to be particularly noted that receiver 96 has two tuning features: sensitivity and window duration. Sensitivity is adjusted by adjustment of variable voltage source 112, and signal "lock on" is effected by tuning of the period of high output state of mono 106 as described. Typically, this period would be adjusted to the minimum necessary to capture the range of excursion of the position modulated signal pulses of interest.

FIG. 2a illustrates an alternate form of detector for receiver 96, it being designated detector 122. In it a form of synchronous signal detection is effected employing sampling bridge (sampler) 124, formed of four matched diodes D1-D4. In essence, it is operated as a single pole, single throw switch, or simply a gate, with an input appearing across resistor 101 and applied to its input terminal I. Its gated output appears at terminal 0 and is fed through capacitor 113 and across resistor 115 to the input of demodulating, active type, low pass filter 117. Sampler 124 (sampler) is gated by a pulse PG illustrated in dashed lines in waveform L of FIG. 4 and applied across terminal G. Pulse PG is generated by mono (monostable multivibrator) 126 as controlled by VCO (voltage controlled oscillator) 127. VCO 127 is in turn controlled to effect synchronization with the average rate of the incoming signals shown in solid lines in waveform L. To accomplish this, the output voltage from sampler 124 is fed through resistor 128 and across a (averaging) capacitor 130, connected to the control input of VCO 127. The thus controlled signal frequency output of VCO 127 is fed to the input of mono 126 which then provides, as an output, gating pulse PG. This pulse is rectangular as shown and having a selected pulse width, typically from 2 to 20 nanoseconds, being selected in terms of the time modulation of the transmitted pulse. It is fed to the primary winding of pulse transformer 132, and the secondary of this transformer is coupled across gate terminals G of sampler 124. Diode 134 is connected across the secondary of transformer 132 and functions to effectively short out the negative transition which would otherwise occur by virtue of the application of the pulse output of mono 126 to transformer 132. In this manner, the gating pulse PG operates to bias all of the diodes of sampler 124 conductive for its duration and thereby gating through the signal input from terminal I to terminal O. As stated above, this signal input is applied through capacitor 113 and across resistor 115 to the input of low pass filter 117.

Figure 4:
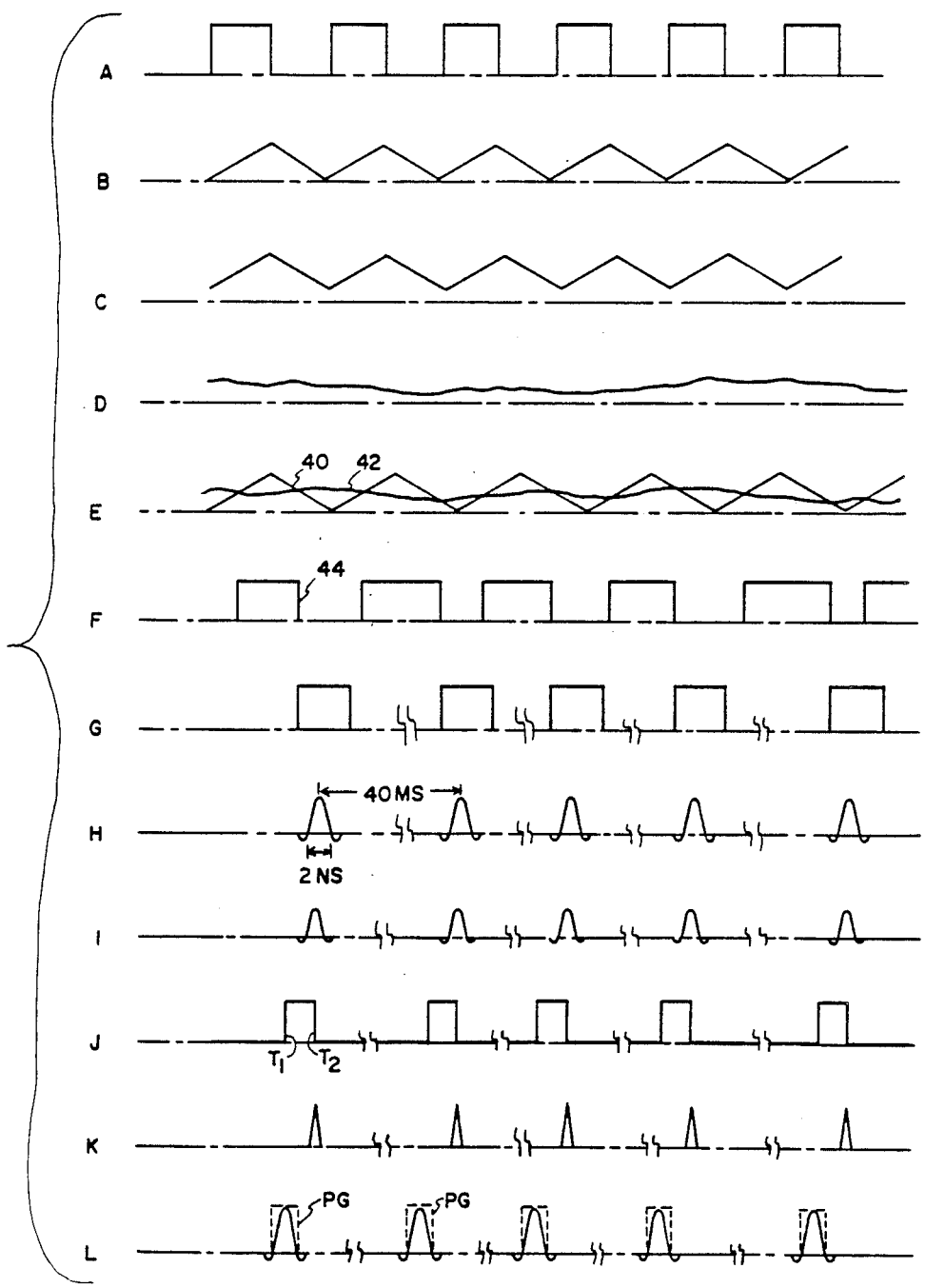
FIG. 4 is a set of electrical waveforms illustrative of aspects of the circuitry shown in FIGS. 1 and 2.

The function of detector 122 is to provide to low pass filter 117 that portion of the input signal shown in waveform L of FIG. 4 appearing within the confines of gating pulse PG. The time position of gating pulse PG is set by the timing of the pulse outputs of VCO 127, and the rate of the output of VCO 127 is determined by the voltage input to VCO 127 as appearing across capacitor 130. Capacitor 130 is chosen to have a time constant which is just below that corresponding to the lowest frequency of modulation to be demodulated. Thus, the output pulse rate of VCO 127 will be such as not to vary the pulse position of gating pulse PG during modulation induced time positions of the input signal (as shown in solid lines in waveform H). As a result, the average value of the signal which is gated through sampler 124 will vary as a function of the modulation originally applied to the signal. This average value is translated into an amplitude type intelligence signal by passing it through low pass filter 117. It is then amplified, as desired, by audio amplifier 119 and then reproduced by loud speaker 120.

FIG. 3 illustrates an alternate embodiment of the receiver shown in FIG. 2. First, the antenna shown, bicone antenna 115 (which includes the actual antenna elements and reflector), is employed as a directional antenna. Second, a mixer 111 is in the form of a double balanced modulator, and it multiplies the amplified output of broadband amplifier 94 by a replica of the transmitted signal (FIG. 4H) generated by template generator 119 (or 234) which may incorporate an avalanche transistor and a passive network as desired to achieve a selected waveform, such as illustrated in waveform H. The passive network may incorporate an open delay line across the transistor or transistors and a shorted delay line in an emitter-circuit. As will be noted, a monostable unit 126 is omitted, and the output of mixer 111 provides its output voltage to low pass filer 117. Capacitor 129 and resistor 131 function as a low pass filter to control VCO 127, which is an oscillator which can be varied by a very small percentage (e.g., 0.0001% to 0.01%) by voltage control to effect a phase lock loop.

Figure 5:
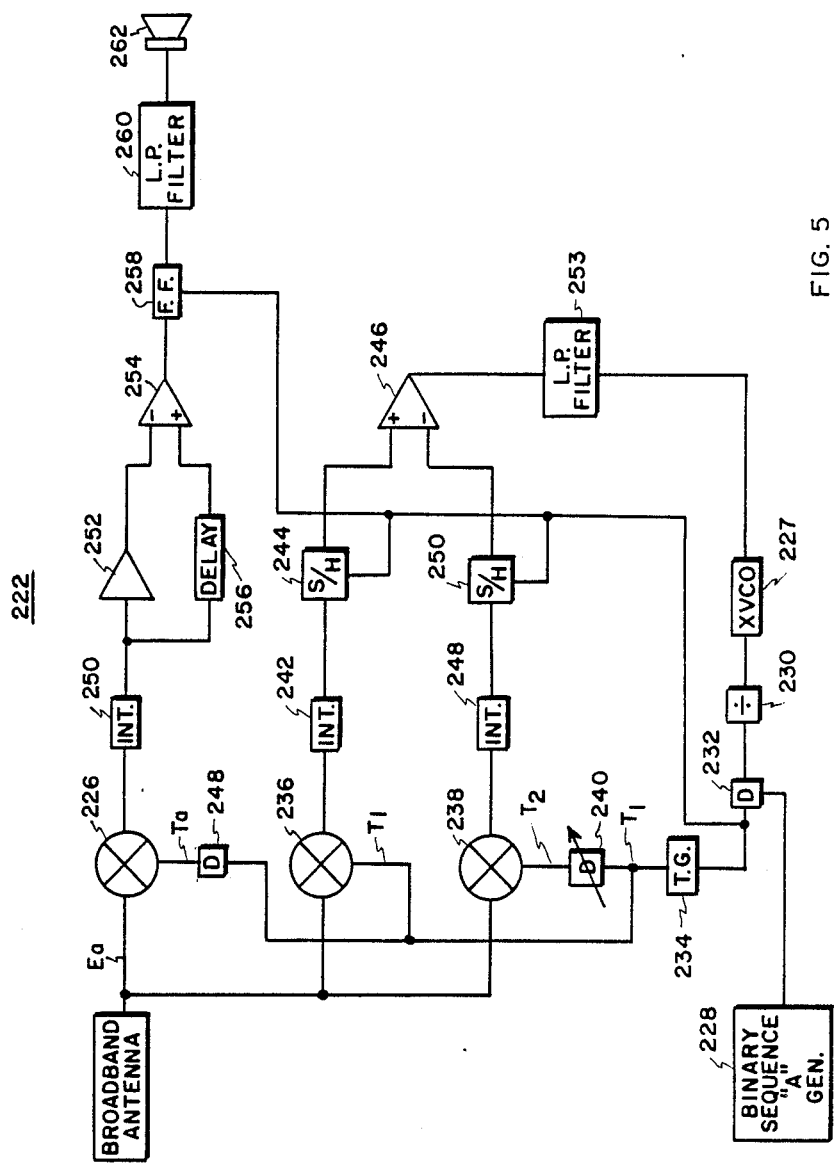
FIG. 5 is a block diagram of an alternate to the radio receiver shown in FIGS. 2, 2a, and 3.

FIG. 5 illustrates a radio receiver which is particularly adapted to receive and detect a time domain transmitted signal. In addition, it particularly illustrates a system for detecting intelligence which has been mixed with a particular offset or dither signal, analog or digital, such as providing by binary sequence "A" generator 33 shown in FIG. 1. It will thus be presumed for purposes of description that switch 39 of FIG. 1 is closed and that the signal transmitted by transmitter 10 is one wherein intelligence signals from microphone 34 are summed with the output of binary sequence "A" generator 33, and thus that the pulse position output of transmitter 10 is one wherein pulse position is a function of both intelligence and offset or dither signals. Thus, the transmitted signal may be described as a pulse position modulated signal subjected to changes in pulse position as effected by a time offset pattern of the binary sequence "A."

Figure 6:
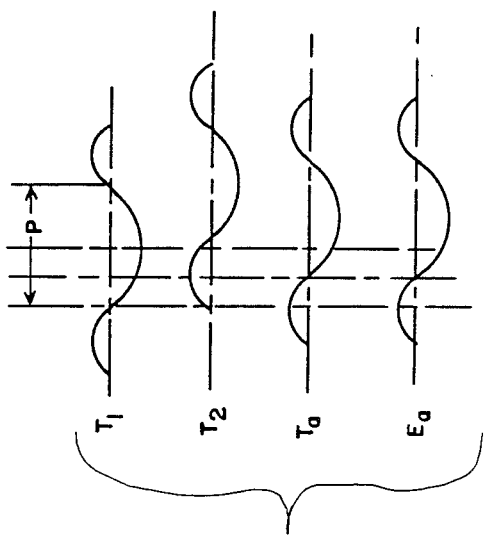
FIG. 6 is a set of electrical waveforms illustrating aspects of operation of the circuitry shown in FIG. 5.

The transmitted signal from transmitter 10 is received by broadband antenna 220 (FIG. 5), and this signal is fed to two basic circuits, demodulation circuit 222 and template generator 234. In accordance with this invention, a replica of the transmitted signal, waveform H (FIG. 4), is employed to effect detection of the received signal, basic detection being accomplished in multiplier or multiplying mixer 226. For maximum response, the template signal, reproduced as waveform T1 in FIG. 6, must be applied to mixer 226 closely in phase with the input, as will be further described. It will differ by a magnitude not perceptible in the waveforms of FIG. 6 as a function of modulation, effecting swings of approximately ±200 picoseconds, typically for a 1 nanosecond pulse. To accomplish such near synchronization, template generator 234 employs a crystal controlled but voltage controlled oscillator 227 which is operated by a control voltage which synchronizes its operation in terms of the received signal.

Oscillator 227 operates at a frequency which is substantially higher than the repetition rate of transmitter 10, and here its output is divided down to the operating frequency of 25 KHz by frequency divider 230, thus equal to the output of divider 14 of transmitter 10.

In order to introduce a pattern of dither corresponding to that provided by binary sequence "A" generator 33, a like generator 228 provides a binary changing voltage to programmable delay circuit 232 which applies to the signal output of divider 230 a delay pattern corresponding to the one effected by binary sequence "A" generator 33 of FIG. 1 when added to intelligence modulation. Thus, for example, this might be four 8-bit binary words standing for the numerals 4, 2, 6, and 8, the same pattern having been generated by binary sequence "A" generator 33 and transmitted by transmitter 10. It is further assumed that this is a repeating binary pattern. Thus, programmable delay 232 will first delay a pulse it receives from divider 230 by four units. Next, the same thing would be done for the numeral 2 and so on until the four numeral sequence has been completed. Then, the sequence would start over. In order for the two binary sequence generators to be operated in synchronization, either the start-up time of the sequence must be communicated to the receiver, or else signal sampling would be for a sufficient number of signal input pulses to establish synchronization by operation of the synchronization system, as will be described. While a repeatable sequence is suggested, it need not be such so long as there is synchronization between the two generators, as by transmission of a sequence start signal and the provision in the receiver of means for detecting and employing it.

Either programmable delay 232 or a second delay device connected to its output would additionally provide a general circuit delay to take care of circuit delays which are inherent in the related circuitry with which it is operated, as will be described. In any event, the delayed output of delay 232, which is a composite of these, will be provided to the input of template generator 234, and it is adapted to generate a replica of the transmitted signal, illustrated in FIG. 6 as waveform T1. Differential amplifier 246 basically functions to provide a D.C. voltage as needed to apply a correction or error signal to oscillator 227 as will enable there to be provided to mixer 226 replica signal Ti exactly in phase with the average time of input signal EA.

In order to generate the nearest signal, the input signal EA is multiplied by two spaced, in time, replicas of the template signal output of template generator 234. The first of these, indicated as T1, is multiplied in mixer 236 by input signal EA and a second template signal T2 is multiplied by the input signal EA in mixer 238. As will be noted in FIG. 6, T2 is delayed from signal T1 by delay 240 by a period of essentially one-half of the duration of the major lobe P of template signal T1.

The output of mixer 236 is integrated in integrator 242, and its output is sampled and held by sample and hold unit 244 as triggered by delay 232. The output of sample and hold unit 244, the integral of the product of the input signal EA and IT1, is applied to the non-inverting input of differential amplifier 246. Similarly, the output of mixer 238 is integrated by integrator 248 and sampled and held by sample and hold 250 as triggered by delay 232, and the integrated product of the input signal EA and template signal T2 is applied to the inverting input of differential amplifier 246.

To examine the operation of differential amplifier 246, it will be noted that if the phase of the output of oscillator 22 should advance, signals T1 and Ei applied to mixer 236 would become closer in phase, and their product would increase, resulting in an increase in input signal to the non-inverting input of differential amplifier 246, whereas the advance effect on template signal T2 relative to the input signal Ei would be such that their coincidence would decrease, causing a decrease in the product output of mixer 238 and therefore a decreased voltage input to the inverting input of differential amplifier 246. As a result, the output of differential amplifier 246 would be driven in a positive direction, and this polarity signal would be such as to cause oscillator 227 to retard. If the change were in the opposite direction, the result would be such that higher voltages would be applied to the inverting input than to the non-inverting input of differential amplifier 246, causing the output signal to decrease and to drive oscillator 227 in an opposite direction. In this manner, the near average phase lock is effected between the input signal EA and template signal TA which is directly employed in the modulation of the input signal. The term "near" is used in that the output of differential amplifier 246 is passed through low pass filter 253 before being applied to the control input of oscillator 227. The cut-off frequency of low pass filter 253 is set such that it will take a fairly large number of pulses to effect phase shift (e.g., 10 to perhaps down to 0.001 Hz). As a result, the response of oscillator 227 is such that it provides an output which causes waveform T1 and thus waveform TA to be non-variable in position with respect to modulation effect. With this limitation in mind, and in order to obtain a synchronous detection of the input signal, the output T1 of template generator 234 is delayed by a period equal to essentially one-fourth the period P of the major lobe of the template and input signal, and this is applied as signal TA with the input signal EA to multiplying mixer 226. As will be noted, the resulting delayed signal, TA, is now near synchronization with the input signal EA, and thus the output of multiplier 226 provides essentially a maximum signal output. In instances where there is simply no signal, or a noise signal, at the signal input of mixer 226, there would be between input signals EA an elapsed time of exactly 40 milliseconds shown in FIG. 4, and a quite minimum time deviation in output would appear from mixer 226.

The signal output of mixer 226 is integrated in integrator 250, and the output signal is multiplied by a factor of 0.5 by amplifier 252. Then this one-half voltage output of amplifier 252 is applied to the inverting input of comparator 254, and this voltage represents one-half of the peak output of integrator 250. At the same time, a second output of integrator 250 is fed through delay 256 to the non-inverting input of comparator 254, delay being such as required for stabilization of the operation of amplifier 252 and comparator 254 in order to obtain an effective comparison signal level that will be essentially free of the variable operation of these two units. The output of comparator 254 represents an essentially precise time marker which varies with the position of input signal EA. It is then fed to the reset input of flip-flop 258, a set input being provided from the output of delay 232 which represents, because of low pass filter 253, an averaged spacing between input signals, thus providing a reference against which the modulation controlled time variable output signal of comparator 254 may be related. It is related by virtue of the output of delay 232 being provided as the set input to flip-flop 258. Thus, for example, the output of flip-flop 258 would rise at a consistent time related to the average repetition rate as essentially dictated by low pass filter 253. Thus, the output of flip-flop 258 would be brought back to zero at a time which reflected the intelligence modulation on the input signal. Thus, we would have a pulse height of a constant amplitude but with a pulse width which varied directly with modulation. The output of flip-flop 258 is then fed through low pass filter 260, which translates the signal from pulse width demodulation and amplitude signal modulation, which is then reproduced by loudspeaker 262.

Assuming that binary sequence generator 33 of transmitter 10 and binary sequence "A" generator 228 for the receiver are operated essentially in synchronization, the effect of the time position dither effected by generator 33 of transmitter 10 will have no dislocating effect on the signal.

As suggested above, in order to ensure synchronization, some form of signaling between the transmitter and receiver as to the starting of the binary sequence generator, generator 33, is required. This may be done by an auxiliary transmitter or by a decoding arrangement wherein there would be provided at the conclusion of, say, one sequence of binary sequence generator 33, a start signal for binary sequence generator 228 of the receiver. Absent this, in the free running mode, there would be effected synchronization by the operation of template generator 224 which for short codes, and with relatively low noise levels, would be relatively short, and for longer codes, or instances where noise was a significant problem, longer periods would be required for synchronization. Where needed, a receiving station might transmit back to the original transmitting station an acknowledgment that synchronization has been achieved.

From the foregoing, it should be appreciated that the applicant has provided both an inexpensive and practical time domain system of communications. While a system has been described wherein a single short pulse, for example, a nanosecond, is transmitted at a repetition rate such that 40 microseconds is between pulses, the invention contemplates that a group of pulses might be sent which would be separated by the longer period. Thus, for example, an 8-bit set might be transmitted as a group wherein there was simply room between the pulses to detect their multiposition shifts with modulation. By this arrangement, it is to be appreciated that intelligence information transmitted would be increased by up to 256 times, or the immunity from noise could be substantially improved by this technique and related ones.

As a further matter, where two-way communications are involved, a single antenna may be used for transmitting and receiving by employment of a conventional transmit-receive directional coupler or transmit-receive switch. Where duplex, simultaneous two-way communications are desired, one station would offset, in time, its pulse transmissions by a desired amount from transmissions of the other by first detecting the time position of pulse transmissions from the other station and effecting a selected delay of each pulse. Alternately, the stations would independently employ different rates and-/or spacing patterns of base, before modulation, pulse signals.

I claim:
1. A time domain radio transmission system comprising:
    antenna means including at least one antenna for coupling signals between said antenna and its environment;
    a radio transmitter comprising:
        pulse generating means for generating reoccurring pulses units, wherein each pulse unit is comprised of at least one pulse signal,
        a source of intelligence signals,
        modulation means responsive to said pulse generating means and said source of intelligence signals for providing, as a modulated output, a train of signals wherein at least a discrete edge region of a last-named signal is varied in time position as a function of said intelligence signals,
        a D.C. power source, and
        power switching means coupled to said antenna and said power source having a control input responsive to a said modulated output for abruptly switching between the states of power applied to said antenna and not being applied to said antenna, whereby discrete switched pulses are transmitted as transmitted signals;
    a radio receiver comprising:
        receiving means coupled to said antenna means for receiving transmissions and for providing received signals,
        signal generating means responsive to a control signal for generating, repetitively, template signals generally corresponding in time to an average time of occurrence of a signal portion of a said received signal from said transmitted signal, and
        signal timing means responsive to said received signals and said template signals for generating said control signal; and
    demodulation means comprising:
        multiplying means responsive to said template signals and said received signals for providing product signals,
        signal means including integration means responsive to said product signals for providing an integral signal which is a function of the integral of said product signal, and means responsive to said integral signal for reproducing said intelligence signals.

2. A system as set forth in claim 1 wherein said signal timing means includes signal controlled oscillating means responsive to received and Template signals for maintaining the time position of said template signals independent of modulation.

3. A system as set forth in claim 1 wherein:
said signal portion of a said received signal including a major lobe of one polarity;
said signal timing means includes first and second signal multipliers and means responsive to said received signals for applying as a first input to each of said first and second multipliers said received signals;
said signal generating means includes means for providing a first set of said template signals as a second input to said first multiplier and a second set of said template signals to said second multiplier, and wherein said second set of discrete signals are delayed for a period of substantially one-half the period of said major lobe of said received signals; and
said timing means includes combining means for combining of the outputs of said first and second multipliers for providing said control signals.

4. A system as set forth in claim 4 wherein said combining means is a differential amplifier.

5. A system as set forth in claim 1 wherein;
said demodulation means includes means responsive to the output of said integration means for providing timed output signals indicative of the time of occurrence of said received signal;
said signal generating means includes means for providing reference output signals which are a function of the average time of occurrence of said received signals;
said demodulation means includes pulse width generation means responsive to said timed output signals and said reference output signals for generating rectangular pulses which vary in width as a function of the variation in time of occurrence of said received signals; and
said demodulation means includes low pass filter means responsive to said rectangular pulses for providing a signal output which varies in amplitude as a function of the width of said rectangular pulses.

6. A system as set forth in claim 1 wherein said power switching means is a light responsive switch, and said modulation means includes means for providing as said train of signals a train of pulses of light.

7. A system as set forth in claim 1 wherein said power switching means comprises at least one avalanche mode operated transistor including a collector electrode connected to said bias power input and capacitive means connected between said collector and across the output of said transistor for storing bias power input pending receipt of a said modulated output.

8. A system as set forth in claim 1 wherein said power switching means includes at least one avalanche mode operated transistor having a collector connected to said bias power input and further including a shorted transmission line connected across said switched power output, said shorted transmission line being of an electrical length approximately equal to one-half of a selected pulse width.

9. A system as set forth in claim 1 wherein said power switching means is immediate to and connected to said antenna.

10. A system as set forth in claim 9 wherein said switching means switches said antenna between a condition of power being applied to said antenna and not being applied to said antenna.

11. A time domain radio transmission system comprising:
antenna means including at least one antenna for coupling signals between said antenna dna a propogation medium;
a radio transmitter comprising:
a source of intelligence signals,
first signal generating means responsive to said source of intelligence signals for generating repetitive, time-spaced signals which vary from a constant pattern as a function of said intelligence signals and by a function of a selected pattern,
a power source, and
power switching means coupled to said antenna and said power source and responsive to said time-spaced signals for switching between states of power applied to said antenna and not being applied to said antenna at varingly time-spaced intervals, whereby discrete switched voltage states are imposed on said antenna and transmitted as varying time separated bursts;
a radio receiver comprising:
receiving means coupled to said antenna means for receiving transmissions and for providing received signals,
second signal generating means responsive to control signals for generating, repetitively, template signals, and
signal timing means responsive to said received signals and said template signals for generating as said control signals, signals corresponding in time to the pattern of the output of said first signal generating means absent an applied intelligence signal; and
demodulation means comprising:
multiplying means responsive to said template signals and said received signals for providing product signals.
first signal means including integration means responsive to said product signals for providing integral signals which are a function of the integral of said product signals, and
second signal means responsive to said integral signals for reproducing said intelligence signals.

12. A system as set forth in claim 11 wherein said selected pattern is a function of binary encoded signals.

13. A system as set forth in claim 11 wherein said first signal generating means includes means for generating a constant rate, variably time-positioned, signals.

14. A system as set forth in claim 13 wherein said first signal generating means comprises:
a fixed frequency oscillator for providing fixed frequency signals;
means for generating independent signals which are a function of said selected pattern; and
signal combining means for combining said fixed frequency signals, said intelligence signals, and said independent signals for providing said variably timed-spaced signals.

15. A system as set forth in claim 11 wherein said signal timing means includes means for effecting a said control signal comprising means responsive to received signals for averaging the effect of said intelligence signals present and thereby eliminating the effective presence of said intelligence signals in a said control signal.

16. A system as set forth in claim 1 further comprising a filter coupled to said antenna.

17. A system as set forth in claim 16 wherein said filter effects time domain shaping of signals applied to said antenna.

18. A time domain system for receiving time domain signal transmissions transmitted by a transmitter comprising:
an antenna for coupling signals between said antenna and its environment;
signal means for generating reoccurring signal units, wherein each signal unit is comprised of at least one pulse signal, a source of intelligence signals, modulation means responsive to said signal generating means and said source of intelligence signals for providing, as a modulated output, a train of signals wherein at least a discrete edge region of last-named signals are varied in time as a function of said intelligence signals, a D.C. power source, and power switching means coupled to said antenna and said power source having a control input responsive to a said modulated output for abruptly switching between the states of power applied to said antenna and not being applied to said antenna, whereby discrete switched effect signals are transmitted as transmitted signals;
said radio receiver comprising:
an antenna, and
receiving means coupled to said antenna for receiving time domain transmissions and for providing received signals;
signal generating means responsive to control signals for generating, repetitively, template signals generally corresponding in time to an average time of occurrence of a signal portion of a said received signal from said transmitted signal;
demodulation means comprising:
multiplying means responsive to said template signals and said received signals for providing product signals,
signal means including integration means responsive to said product signals for providing an integral signal which is a function of the integral of said product signal, and
means responsive to said integral signal for reproducing said intelligence signals.

19. A time domain radio receiver as set forth in claim 18 wherein said signal timing means includes signal controlled oscillating means for maintaining the time position of control signals independent of modulation.

20. A system as set forth in claim 18 wherein:
said signal portion of a said received signal including a major lobe of one polarity;
said signal timing means includes first and second signal multipliers and means responsive to said received signals for applying as a first input to each of said first and second multipliers said received signals;
said signal generating means includes means for providing a first set of said template signals as a second input to said first multiplier and a second set of said template signals to said second multiplier, and wherein said second set of discrete signals are delayed for a period of substantially one-half the period of said major lobe of said received signals; and
said timing means includes combining means for combining of the outputs of said first and second multipliers for providing said control signals.

21. A system as set forth in claim 20 wherein said combining means is a differential amplifier.

22. A system as set forth in claim 18 wherein:
said demodulation means includes means responsive to the output of said integration means for providing timed output signals indicative of the time of occurrence of said received signal;
said signal generating means includes means for providing reference output signals which are a function of the average time of occurrence of said received signals;
said demodulation means includes pulse width generation means responsive to said timed output signals and said reference output signals for generating rectangular pulses which vary in width as a function of the variation in time of occurrence of said received signals; and
said demodulation means includes low pass filter means responsive to said rectangular pulses for providing a signal output which varies in amplitude as a function of the width of said rectangular pulses.

23. A time domain radio transmitter for transmitting signals to a radio receiver wherein the radio receiver comprises an antenna, receiving means coupled to said antenna means for receiving transmissions and for providing received signals, signal means responsive to a control signal for generating, repetitively, template signals generally corresponding in time to an average time of occurrence of a signal portion of a said received signal from a transmitted signal, signal timing means responsive to said received signals and said template signals for generating a said control signal, multiplying means responsive to said template signals and said received signals for providing product signals, signal means including integration means responsive to said product signals for providing an integral signal which is a function of the integral of said product signal, and means responsive to said integral signal for reproducing said intelligence signals, said transmitter comprising:
an antenna,
a source of intelligence signals,
signal generating means responsive to said source of intelligence signals for generating repetitive, time-spaced signals which vary from a constant pattern as a function of said intelligence signals and by a function of a selected pattern,
a power source, and
power switching means coupled to said antenna and said power source and responsive to said time spaced signals for abruptly switching between states of power applied to said antenna and not being applied to said antenna at varyingly time-spaced intervals, whereby discrete switched voltage states are imposed on said antenna and transmitted as varying time separated signals.

* * * * *